Sept. 20, 1932.  C. L. IPSEN ET AL  1,878,522
BAKING OVEN
Filed Aug. 12, 1929  3 Sheets-Sheet 1
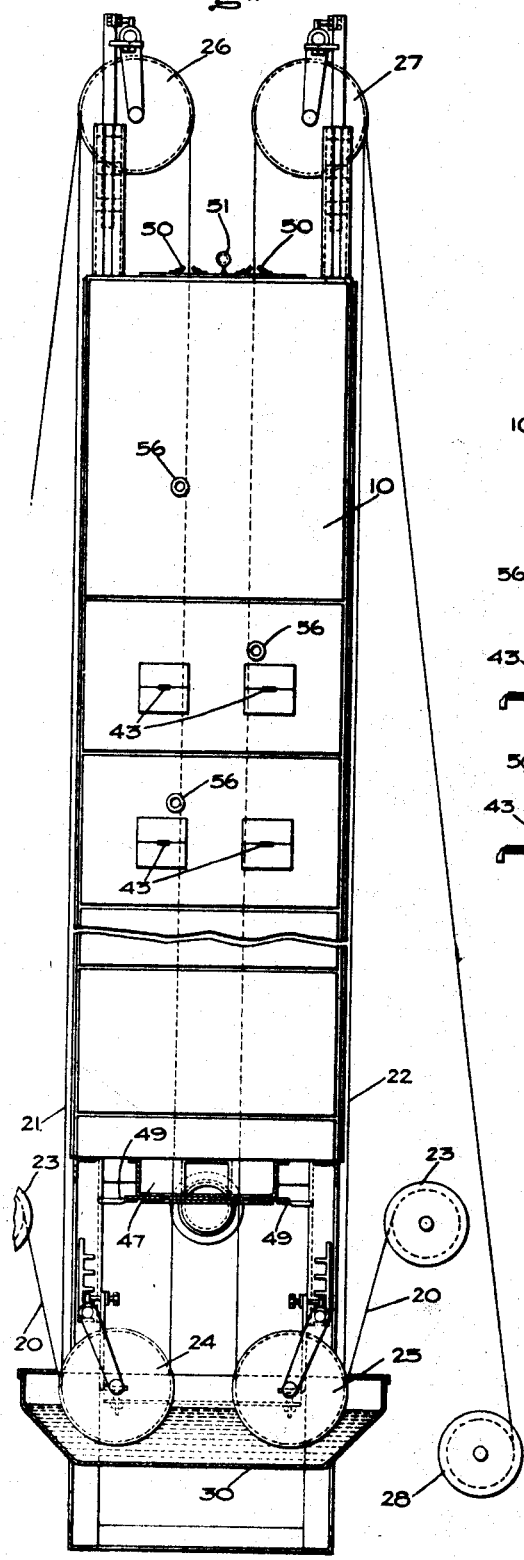
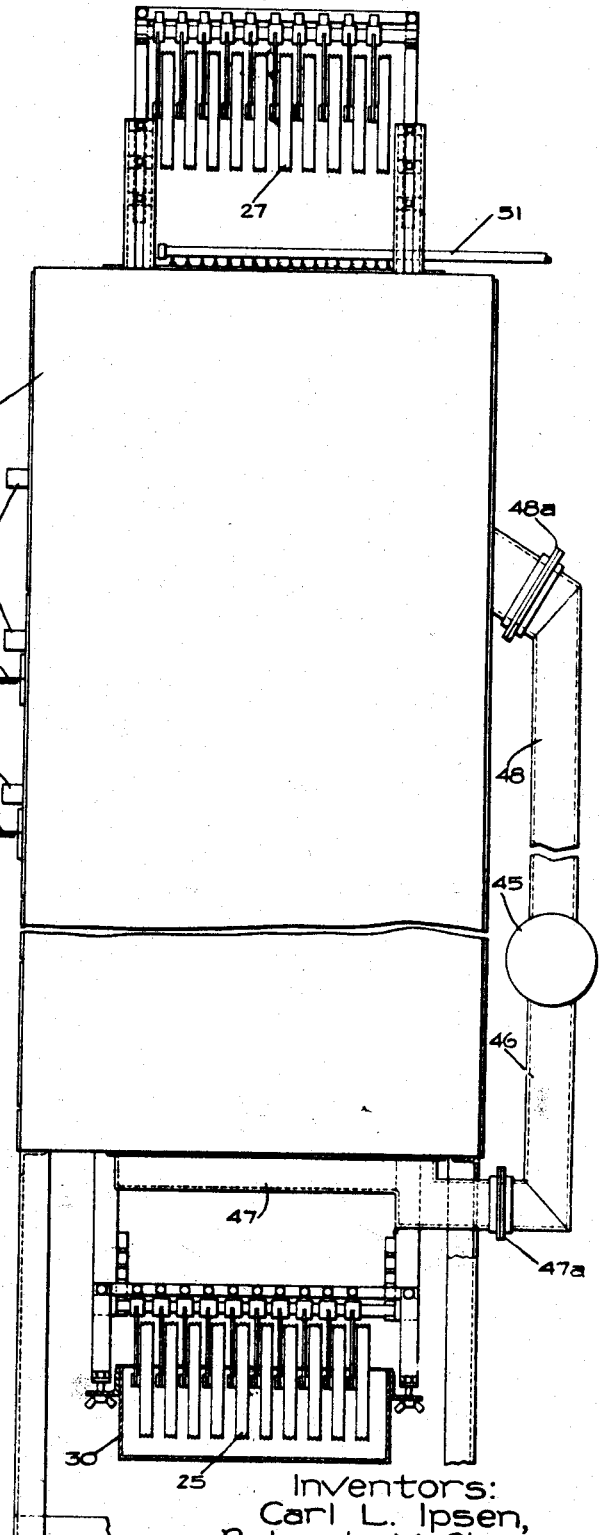
Inventors:
Carl L. Ipsen,
Robert M. Cherry,
by Charles E. Tullar
Their Attorney.

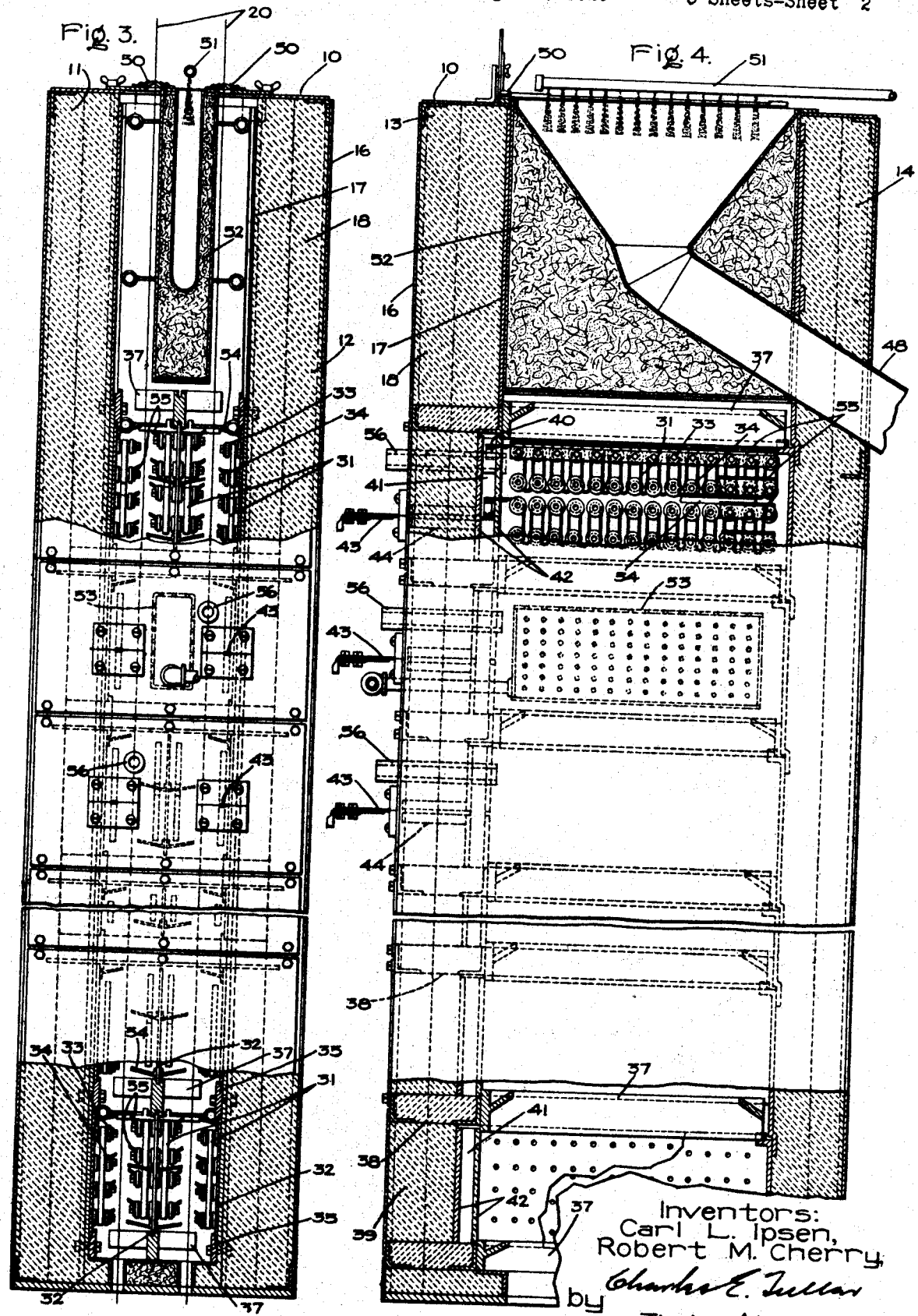

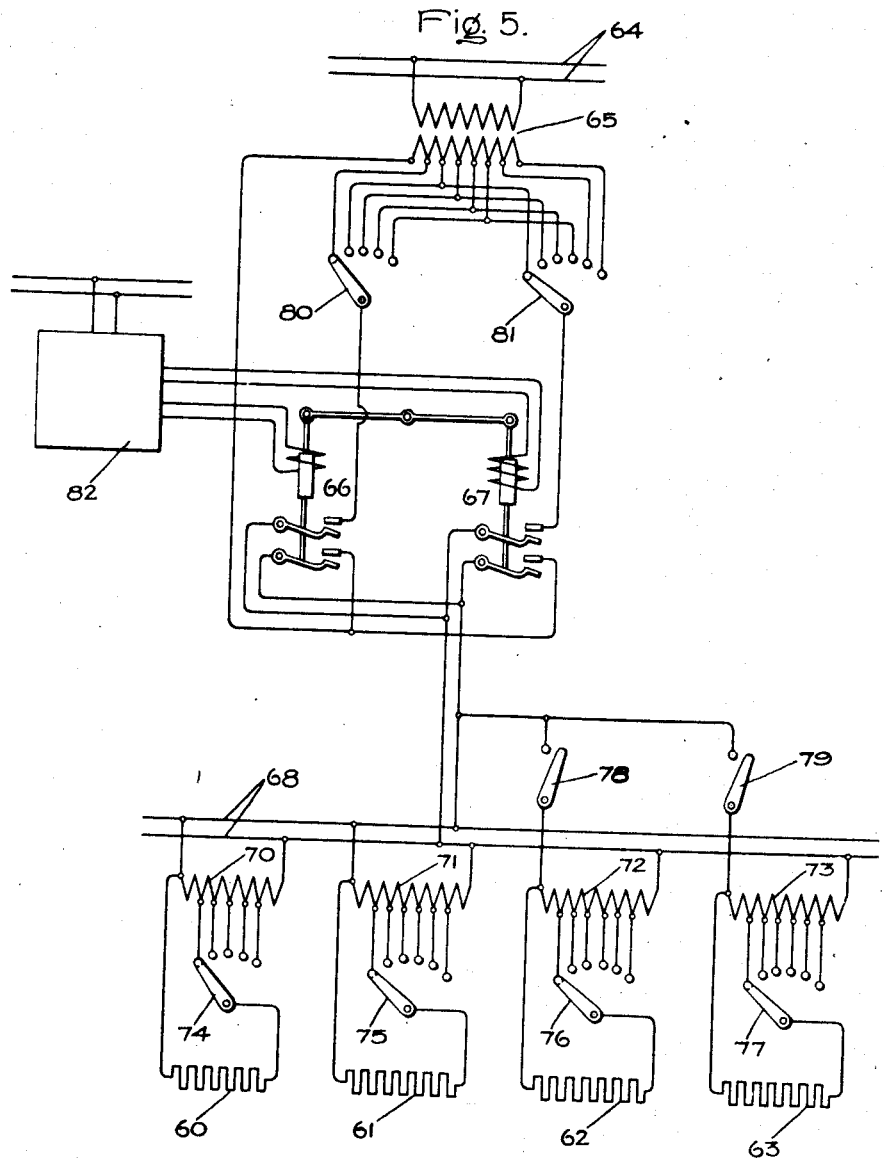

Patented Sept. 20, 1932

1,878,522

UNITED STATES PATENT OFFICE

CARL L. IPSEN AND ROBERT M. CHERRY, OF SCHENECTADY, NEW YORK, ASSIGNORS TO GENERAL ELECTRIC COMPANY, A CORPORATION OF NEW YORK

BAKING OVEN

Application filed August 12, 1929. Serial No. 385,187.

Our invention relates to baking ovens, more particularly to baking ovens of the type wherein the material to be heated is passed continuously through the oven, and has for its object the provision of an improved oven of this character.

Although obviously it has other applications our invention is particularly useful in connection with apparatus for baking one or more coats of varnish or enamel on material such as an electric conductor which is passed continuously through a heating chamber.

Wire enameling operations require a very uniform application of heat and a very accurate temperature control. Thus, it is very necessary in order to afford satisfactory results both with respect to the quality of the product and the quantity produced, that there be a uniform distribution of heat, an absence of excessive localized heat and an accurate thermal control. It will be appreciated that it is very difficult with an oven of the aforementioned type to control the temperature throughout the oven by reason of the large amount of air leakage at the points where the material enters and leaves the oven. Our invention in one of its aspects, therefore, contemplates the provision of an oven so constructed that it will inherently permit a close and accurate temperature control and will provide a uniform distribution of heat.

In carrying out our invention in one form thereof, we position a plurality of electric heating units on opposite sides of the path of movement of the material to be heated and throughout substantially the entire length of this path of movement. The heating units will be placed comparatively close together so as to provide the substantially uniform distribution of heat. Each heating unit preferably will be removably mounted so that it may be readily positioned within or removed from the oven.

In order to insure an accurate temperature control, we provide suitable means for withdrawing gas at the points where the material enters and leaves the oven. Moreover, we provide suitable means for introducing air into the upper portions of the oven so as to counteract any tendency for the temperature to rise abnormally. To provide a more accurate temperature regulation, we position a plurality of baffles within the oven so as to throughly and properly distribute the ventilating air.

The arrangement of the heating units and baffle structure together with the control of the gases withdrawn from the oven and the air supplied to it practically eliminates any possibility of localized heat conditions, and moreover insures a uniform heat distribution throughout the oven.

For a more complete understanding of our invention reference should be had to the accompanying drawings in which Fig. 1 is a simplified end elevation of a baking oven embodying our invention; Fig. 2 is a simplified side elevation of the oven shown in Fig. 1; Fig. 3 is an enlarged fragmentary end elevation of the oven, partly in section; Fig. 4 is an enlarged fragmentary side elevation of the oven, partly in section; and Fig. 5 illustrates in diagrammatic form the control system for the heating elements.

Referring to the drawings, we have shown our invention as applied to the enameling of wire although obviously it has other applications. As shown, we have provided an elongated vertically arranged oven 10 which, briefly, comprises side walls 11 and 12 and end walls 13 and 14 which serve to define a heating chamber. Each of these walls is formed by a pair of spaced metallic linings 16 and 17 between which a suitable heat insulating material 18, such as magnesia block, is positioned.

The wire 20 to be enameled is passed from supply spools or reels through the oven lengthwise in a vertical direction and after being enameled is wound upon suitable receiving spools. Preferably, the wire is passed back and forth through the oven several times, it being given a coating of enamel before each pass. In the arrangement shown each wire is passed through the oven three times and the oven is of sufficient width to accommodate ten wires so that there are thirty lengths running through the oven in spaced relation. As shown in Figs. 1 and 2, there are two groups of wires 21 and 22.

The wires are supplied to the oven from the supply spools 23 from which they are passed over groups of idler sheaves 24 and 25. From these sheaves the wires are passed upwardly into the interior of the oven and at the top pass over another set of idler sheaves 26 and 27 and thence downwardly on the exterior of the oven to the sheaves 24 and 25. From these sheaves the wires again are passed upwardly into and through the oven. Preferably, each wire will be provided with separate sets of sheaves, each wire being passed upwardly through the oven until it has completed three passes. Thus three lengths of the same wire are passed upwardly through the oven at the same time. It will be understood that the last length of each wire is led to a suitable receiving spool 28 upon which it is wound.

The sheaves of the groups 24 and 25 run in a tank 30 which contains a sufficient quantity of enamel varnish or other material which is to be applied to the wire. As shown, these sheaves are partially immersed so that as the wires pass around the sheaves they are given a fresh coating of enamel. It will be understood that suitable wipers may be provided to regulate the thickness of the coating as desired. Moreover, it will be understood that the wire will be pulled through the oven by any suitable means (not shown) as for instance an electric motor which is suitably connected mechanically with the take-off or receiving sheaves 28.

It is also possible to control the thickness of the enamel coating by varying the position of the sheaves 24 and 25. It will be understood that upon entering the oven the enamel sets and, therefore, the thickness of the coating in the finished product may be varied by varying the distance between the sheaves 24 and 25 and the point where the wires enter the oven. Preferably and as shown, therefore, the axes about which the sheaves 24 and 25 are adjustable vertically.

As has been pointed out, it is necessary to apply heat uniformly to the wire lengths as they pass through the oven. To this end, we provide a plurality of electric heating units 31 supported in the oven vertically one above the other and on opposite sides of the path of travel of each length of the wire within the oven. Preferably, these units will be positioned on opposite sides of this path of movement.

As shown (Figs. 3 and 4) each unit comprises a base plate 32 upon which is mounted a strip-like resistance element which will be formed from some suitable material, such as a nickel-chromium alloy. The resistor is provided with a plurality of supporting and spacing members 33 and 34, each of these members being formed from a suitable electrically and heat insulating material such as alumdum compound and being formed in the shape of a spool, the body portion of which serves to receive the strip-like resistor. It will be observed by reference to Fig. 3 that the resistor is hung from the supporting insulators 33 in a series of depending loops which are suitably spaced at their lower end portions by the insulators 34. Preferably and as shown in Fig. 4, the strip-like resistor is placed upon the support in two sections comprising two rows of the depending loops identically arranged and supported upon the plate. These sections as shown, are electrically connected in series relation.

Preferably each heating unit will be removably mounted within the oven so that it may be readily removed from or positioned within the oven. As shown in Fig. 3, each of the heating units, which is to be secured upon the oven walls, is provided with a pair of brackets 35 the lower bracket of which serves to support the plate 32 and the upper of which together with the lower bracket serves to slidably receive the plate and guide it into position within the oven.

Each pair of the central heating units, i. e., those units disposed between the units positioned upon the opposite side walls of the oven chamber, are provided with a common supporting plate 32. Otherwise, the structure of these units is identical with the structure of the units positioned upon the walls. These companionate heating units, supported in the central portion of the oven, are each provided with a pair of suitable supporting brackets 37 which serve to slidably receive the supporting base portion 32. It will be understood that each bracket 37 will be suitably secured to the end walls 11 and 12 in horizontal position crosswise of the oven so as to support the central heating units in substantially parallel relation with the side heating units. It is to be understood that in the event only one group of wires be passed through the oven, it is necessary to use but two sets of heating units, these sets being positioned upon the opposite walls of the oven.

It will be observed that the front wall 13 of the oven is provided with a plurality of openings 38, one opening being provided for each set of heating units. Each opening will be sufficiently large so that the units positioned opposite the opening may be inserted or removed readily through the opening. Each opening is normally closed by a suitable door or cover 39. These covers, preferably, will be formed from a suitable heat insulating material such as that used to construct the oven walls.

The terminals of each set of heating units are electrically connected with suitable bus bars 40 which are positioned in a heat insulated space 41 provided in the corresponding openings 38. It will be observed that the heat insulating space 41 is defined by a pair of suitable board-shaped members 42 disposed on opposite sides of the bus bars. These members will be formed from a suitable heat insulating material, such as asbestos. The bus bars 40 are electrically interconnected and are connected with the exterior of the oven by means of a suitable lead member 43 which is passed through a suitable electrically insulating bushing 44 provided in the cover member 39. The leads 43 provided for the various units may be electrically interconnected in any suitable manner. Preferably, however, these members will be connected in series. Thus, the heating units of each set will be connected in series relation and the sets themselves likewise will be connected in series relation.

In order to insure a uniform distribution of heat, we provide suitable means for controlling the gas content of the oven and the flow of the gases through the oven. It will be observed that the oven would naturally have the draft characteristic of a chimney and consequently the hot air would tend to rise to the top. This draft characteristic is utilized to supply the ventilating air to the oven which air is drawn into the bottom portion of the oven through the openings around the wires. It will be obvious that if this draft action were uncontrolled, very non-uniform and variable temperatures would prevail in the oven. To suitably control this draft and consequently to govern the quantity of air supplied to the oven, and to regulate the flow of the gases through the oven, we connect the upper and lower ends of the oven with suitable suction means which exhaust to the outside atmosphere. As shown, we connect the lower portion of the oven with the suction device 45 by means of a duct 46 which is connected with the lower openings in the oven by means of a suitable exhausting chamber 47. The upper portion of the oven is connected with the suction device by means of a suitable duct 48. As shown, this duct 48 at its oven end is flared outwardly so as to form a funnel-like end, the mouth of which is disposed between and adjacent the openings provided in the top of the oven. It will be understood that the suction device 45 will serve to draw the gases emitted from these openings through the duct 48 and exhaust them to the outside atmosphere.

As shown, the openings in the ventilating chamber 47 through which the wires pass into the oven are adjustable, these openings being provided with suitable shutters 49 for this purpose. Likewise, the openings in the top of the oven from which the wires pass are provided with suitable adjustable shutters 50. It will be understood that by suitably regulating the sizes of these openings and the suction applied, the air supplied to the oven will be controlled and the flow of gases through the oven will be regulated so as to maintain the desired pressure conditions. Thus, the air supply and the flow of gases may be so regulated that substantially atmospheric pressure conditions will be established throughout the oven. It will be understood that the suction may be regulated by means of suitable dampers 47a and 48a positioned in the ducts 47 and 48, respectively.

In order to cool the hot gases which are withdrawn from the top portions of the oven, water is sprayed into the funnel-shaped mouth of the duct 48 by means of a suitable spray nozzle 51. Thus, these gases which are removed at a fairly high temperature such as 700° F. when withdrawn will be cooled by the spray to a fairly low temperature such as 70° F. Preferably, the funnel portion of the duct will be heat insulated by a suitable insulating material 52, such as loose rock wool.

We have found that there is a tendency for the oven gases to accumulate in the upper regions of the oven and thereby produce a localized high temperature condition in this portion of the oven. In order to completely diffuse the gases in this portion, we introduce cooling and ventilating air by means of a suitable air duct 53. It will be understood that this auxiliary air will be admitted in sufficient quantity to cool and diffuse the gases in the upper regions of the oven. As shown, this duct comprises an apertured box-like compartment which is positioned in the upper portion of the oven between one set of the wall heating units. It will be observed that this compartment by reason of its relatively large exterior surface will distribute the auxiliary air throughout the surrounding oven chamber.

It will be understood that by properly controlling the ventilating air admitted through the bottom openings and the auxiliary supply of air admitted into the upper regions of the oven, together with a suitable control of the gases withdrawn from the top of the oven, very satisfactory temperature conditions may be maintained.

To insure a complete distribution of the ventilating air, that is, to insure a complete intermingling of the ventilating air with the volatiles formed within the oven, we provide the oven with suitable baffle means positioned so as to give the oven gases a tortuous route. As shown, we have provided a plurality of baffles 54 positioned upon opposite sides of the path of movement of each length of the material being passed through the oven and in staggered spaced relation with each other. These baffles insure a complete distribution of the ventilating air. As shown, these baffles are suitably secured to the resistor supporting plates 32 in proper relation with respect to each other.

The foregoing construction is important by reason of the fact that the varnish or enamel undergoes an oxidizing change during the baking process. It is important therefore that the wire be constantly surrounded with fresh heated ventilating air. Moreover, the baffle structure serves to break up any tendency for the gases to follow or cling to the wire.

Preferably, each heating unit will be provided with a plurality of guard members 55 which serve the double function of protecting the strip-like resistors and, acting jointly with the baffles 54, of distributing the ventilating air.

In the operation of the oven it will be understood that the wires will be passed through the oven a plurality of times, each length being given a coating of the enamel before it is passed through the oven. Moreover, it will be understood that the air supplied to the oven and the gases withdrawn therefrom will be so controlled that a substantially uniform temperature condition will be maintained throughout the oven. Any suitable temperature may be obtained although we have found that approximately 800° F. is satisfactory for certain kinds of enameling operations. The temperature will be determined by means of a plurality of temperature indicators (not shown) such as thermo-couples, suitable openings 56 spaced along the length of the oven being provided for the indicators.

We have found it to be necessary to energize the heating units in the upper portions of the oven only while the oven is being prepared for the baking operation. In other words these upper heating units serve merely as warming units. After the oven has been heated to its working temperature, these upper units may be deenergized. It will be understood, however, that by properly regulating the upward flow of the oven gases and the air supplied to the upper portions of the oven, the temperature in these portions will be maintained at substantially the same degree as in the remaining portions of the oven.

Preferably, while in operation, the heating units will be energized from two electrical supply sources, one of relatively high voltage and the other of relatively low voltage. The high heat is adjusted so as to supply slightly more than the normal power requirements while the low heat is adjusted so as to supply slightly less than the normal power requirements. As shown (Fig. 5), we have represented the heating units together with their control system diagrammatically. Although, we have shown but four units 60, 61, 62 and 63, it will be understood that any desired number of units may be used. These units are electrically connected with a suitable source of alternating current supply 64 through a suitable step-down transformer 65, a pair of controlling contactors 66 and 67, and feed conductors 68. For purpose of illustration these units have been shown as connected in parallel relation with each other. Preferably and as shown, although not necessarily so, the heating resistors 60, 61, 62 and 63 will be connected through suitable transformers 70, 71, 72 and 73 respectively. While we have shown auto-transformers for this purpose, it will be understood that any suitable type of transformer may be used. Suitable adjustable switches 74, 75, 76 and 77 are interposed between the respective resistors and their transformers so that various voltages for each resistor may be obtained.

As shown, suitable switches 78 and 79 are interposed between the transformers 72 and 73, respectively, and the supply source. Thus, the resistors 62 and 63, which may be located on the upper portions of the oven may be disconnected from the supply source while the remaining resistors are energized.

The contactor 66 when closed serves to connect the heating resistors with a relatively low voltage through the switch 80 while the contactor 67 when closed serves to connect the resistors with a relatively high voltage through the switch 81. It will be observed that these switches 80 and 81 are adjustable so that various suitable relationships between the high and low voltages, i. e. high and low heats may be obtained.

The energizing coils for the control contactors 66 and 67 are controlled by a suitable temperature responsive device 82 which will serve to alternately close the contactors responsively to temperature changes so as to maintain a substantially uniform temperature condition within the oven. As shown, the contactors are mechanically interlocked so that it is possible to have only one contactor closed at a time. The temperature responsive device may be located at any convenient position within the oven. Preferably, however, it will be positioned in the lower central portions of the oven. It is believed to be unnecessary for a proper understanding of this invention to describe in detail the construction of the temperature responsive device since any preferred well known construction may be used.

The effect of this system of control is to make any change in temperature take place very slowly thereby enabling the control device 82 to function with very slight lag behind the temperature change. This precludes the likelihood of variations in temperature from the limits set upon the controlling device at points remote from the device.

We have found that the foregoing control of the heating resistors insures a very uniform and high quality product.

What we claim as new and desire to secure by Letters Patent of the United States, is:

1. The combination with an oven provided with walls forming a vertically elongated baking chamber, of means for passing the material to be heated continuously through said chamber, a plurality of heating units providing a source of heat upon opposite sides of the path of said material and throughout substantially the entire length of said chamber, bracket members detachably securing said units arranged so that each unit can be removed separately of the rest, the walls of said oven being provided with openings through which said unit can be inserted and removed from said oven and closure members for said openings.

2. The combination with an oven provided with walls forming a vertically elongated baking chamber, of means for passing the material to be heated back and forth continuously lengthwise through said chamber, a plurality of electric heating units positioned upon opposite sides of each length of the material being passed through the chamber so as to provide a uniform source of heat throughout substantially the entire path of travel of the length within the chamber, and supporting bracket members slidably receiving said heating units so that each unit can be slid laterally into and out of its supporting members independently of the remaining units, the walls of said oven being provided with openings providing for the insertion and removal of said units and closure members for said openings.

3. The combination with an oven provided with walls forming a vertically elongated baking chamber, of means for passing the material to be baked continuously through said chamber from one end to the other, heating means for said chamber comprising a plurality of electric heating units arranged one above the other vertically in said oven on opposite sides of the path of travel of said material, bracket members slidably receiving said heating units so that each unit can be slid laterally into and out of its supporting brackets, the walls of said oven being provided with openings providing for the insertion and removal of said units and closure members for said openings.

4. The combination with an oven provided with walls forming a vertically elongated baking chamber, of means for passing the material to be baked continuously through said chamber from one end to the other, heating means for said chamber comprising a plurality of electric heating units mounted one above the other vertically in said chamber on opposite sides of the path of said material and substantially throughout the length of said chamber and means for supporting each heating unit so that it may be removed laterally from said chamber, and normally closed openings in said walls providing for the insertion and removal of said units.

5. The combination with an oven having walls forming a vertically elongated heating chamber, of heating means for said oven comprising a resistance element, a support for said resistance element, and means for mounting said support vertically upon a side wall of said oven comprising a plurality of supporting and guiding brackets for slidably receiving the support so that the heating means may be removed as a unit laterally from the oven, said oven walls being provided with a normally closed opening through which the unit can be inserted and removed from said heating chamber.

6. The combination with a baking oven provided with walls forming a vertically elongated heating chamber having a front opening therein, of heating means for said chamber comprising a plurality of electric heating units mounted in said chamber vertically one above the other, each heating unit comprising a metallic plate-like supporting member, a resistance element mounted in spaced relation upon said plate-like member, means for supporting said plate-like member in substantially parallel relation with the side walls of said oven, said supporting means providing for ready removal of said heating unit through said front opening and means normally closing said front opening.

7. The combination with a baking oven provided with walls forming a heating chamber, of heating means therefor comprising a metallic plate-like support, a resistance element mounted on said support in electrically insulated relation therewith and means for securing said plate-like support vertically upon a side wall of said oven comprising a pair of guide brackets mounted upon said wall so as to slidably receive said support, said side wall being provided with an opening through which the platelike support may be inserted and removed and means for normally closing said openings.

8. The combination with a baking oven provided with walls forming a vertically elongated heating chamber, of heating means therefor comprising a plurality of electric heating units mounted vertically one above the other upon the side walls of said oven, each heating unit comprising a metallic plate-like supporting member, means for slidably receiving said plate-like supporting member, electrically insulating supports mounted on said plate, a strip-like heating resistor hung from said supports in a series of depending loops, and spacing members for said loops secured to said plate, said walls being provided with a separate normally closed opening for each heating unit through which the unit may be removed laterally from the oven.

9. The combination with a baking oven provided with walls forming a vertically elongated heating chamber, of means for passing the material to be heated continuously through said chamber in a vertical direction, means for withdrawing gases from the chamber at the point where said material leaves the chamber, means for controlling the air supplied to the chamber at the point where said material enters the chamber so as to tend to counteract the draft tendency of said gases to rise in said chamber and means for introducing air to the chamber between said points to diffuse the oven gases in the regions above the point of admission of said gases.

10. The combination with a baking oven, of means for heating said oven throughout substantially its entire length, means for passing the material to be heated continuously through said chamber from one end to the other, means for controlling the air supplied to said chamber at the region where the material enters the chamber so as to substantially counteract the tendency of the gases to rise in the chamber, means for withdrawing smoke from the chamber at the region where the material leaves the chamber and means for introducing cooling air into the upper portion of the chamber.

11. The combination with a baking oven provided with walls defining a vertically elongated heating chamber having openings at the bottom and top thereof to provide for the ingress and the egress of the material to be heated, of heating means for said chamber comprising a plurality of electric heating units arranged vertically throughout substantially the full length of said chamber, suction means connected to the bottom of said chamber for controlling the supply of air through said bottom openings so as to substantially counteract the tendency of the gases to rise to the top of said oven, suction means connected to the top of said chamber and exhausting to the outside atmosphere for withdrawing smoke from said chamber and means for introducing air into the top portion of said chamber.

12. The combination with an enameling oven provided with walls defining a vertically elongated baking chamber, of heating means for said chamber, means for passing the material to be treated continuously through said chamber from one end to the other, said chamber being provided with openings through which the material enters and leaves said chamber and means for adjusting the areas of said openings so as to control the flow of air into and the flow of gases from said chamber.

13. The combination with an enameling oven provided with walls defining a vertically elongated baking chamber, of heating means for said chamber, means for passing the material to be heated lengthwise through said chamber, means for introducing ventilating air to said baking chamber and a plurality of baffles positioned upon the opposite sides of the path of travel of said material so as to circulate said ventilating air continuously over and about the material being passed through said chamber.

14. An oven for baking enamel and the like, comprising walls forming a vertically elongated baking chamber, means for passing the material to be treated lengthwise through said chamber, heating means providing a source of heat upon opposite sides of the path of travel of the material being passed through said chamber and throughout substantially its entire length, means for introducing ventilating air at the lower region of said chamber and a plurality of baffles positioned in staggered spaced relation on opposite sides of said path of travel and substantially throughout its entire length so as to direct the oven gases tortuously through said oven and so as to insure a commingling of said ventilating air and the volatiles formed during the enameling process.

15. The combination with an oven provided with walls forming a vertically elongated baking chamber, of means for passing the material to be heated lengthwise through said baking chamber, heating means for said baking chamber comprising a plurality of electric heating units positioned on opposite sides of the path of travel of the material within the chamber and throughout substantially its entire length, a plurality of baffles supported on opposite sides of said material in staggered relation with each other so as to give the oven gases a tortuous route through said chamber and a plurality of guard members for said heating units.

In witness whereof, we have hereunto set our hands this 10th day of August, 1929.

CARL L. IPSEN.
ROBERT M. CHERRY.